(12) United States Patent
Kim

(10) Patent No.: US 10,814,863 B2
(45) Date of Patent: Oct. 27, 2020

(54) SYSTEM AND METHOD FOR AUTOMATIC PARKING

(71) Applicant: MANDO CORPORATION, Pyeongtaek-si, Gyeonggi-do (KR)

(72) Inventor: Jae Suk Kim, Yogin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 195 days.

(21) Appl. No.: 15/793,810

(22) Filed: Oct. 25, 2017

(65) Prior Publication Data
US 2018/0111608 A1      Apr. 26, 2018

(30) Foreign Application Priority Data

Oct. 26, 2016   (KR) .......................... 10-2016-0139849

(51) Int. Cl.
*B60W 10/00*      (2006.01)
*B60W 30/06*      (2006.01)
(Continued)

(52) U.S. Cl.
CPC ............ *B60W 30/06* (2013.01); *B60W 10/06* (2013.01); *B60W 30/08* (2013.01); *B60W 50/14* (2013.01);
(Continued)

(58) Field of Classification Search
CPC ....... B60W 30/06; B60W 10/06; B60W 30/08
See application file for complete search history.

(56) References Cited

U.S. PATENT DOCUMENTS

2014/0019027 A1*  1/2014  Kojima ................... B60L 50/51
                                                            701/102
2016/0185350 A1*  6/2016  Kelly .................... B60W 30/18
                                                            701/94
(Continued)

FOREIGN PATENT DOCUMENTS

CN          1755331 A       4/2006
CN        101198509 A       6/2008
(Continued)

OTHER PUBLICATIONS

Chinese Office Action dated Nov. 6, 2019 issued in Chinese Patent Application No. 201711017303.4.

*Primary Examiner* — Jess Whittington
(74) *Attorney, Agent, or Firm* — Morgan, Lewis & Bockius LLP

(57) ABSTRACT

When a difference between a target speed and a movement speed of the vehicle exists in a process of setting a parking space based on information acquired through a sensor of the vehicle and controlling automatic parking, the system and the method may determine whether there is an obstacle equal to or smaller than a predetermined height in a process of identifying and re-identifying the obstacle by controlling engine driving torque, and a location of the existing obstacle, reset an initially set parking space or a parking termination condition according to the location of the obstacle, and perform the automatic parking control, thereby detecting the obstacle even though the obstacle is equal to or smaller than the predetermined height and is not detected by a sensor, within the parking space or on a movement path to the parking space and completing the automatic parking control.

11 Claims, 8 Drawing Sheets

(51) Int. Cl.
  *B60W 50/14* (2020.01)
  *B60W 10/06* (2006.01)
  *B60W 30/08* (2012.01)

(52) U.S. Cl.
  CPC . *B60W 2510/0657* (2013.01); *B60W 2520/10* (2013.01); *B60W 2554/00* (2020.02); *B60W 2710/0666* (2013.01)

(56) References Cited

U.S. PATENT DOCUMENTS

2017/0032680 A1* 2/2017 Imai .................... G06K 9/6293
2017/0300057 A1* 10/2017 Kim ................... B62D 15/0285
2018/0111610 A1* 4/2018 Romainczyk ...... B62D 15/0285

FOREIGN PATENT DOCUMENTS

CN 103813953 A 5/2014
CN 105517880 A 4/2016

\* cited by examiner curb or obstacle

SYSTEM AND METHOD FOR AUTOMATIC PARKING

CROSS REFERENCE TO RELATED APPLICATION

This application claims priority from Korean Patent Application No. 10-2016-0139849, filed Oct. 26, 2016, which is hereby incorporated by reference for all purposes as if fully set forth herein.

BACKGROUND OF THE INVENTION

1. Field of the Invention

The present disclosure relates to a system and a method for automatically controlling parking of a vehicle.

2. Description of the Prior Art

In general, while not driving a vehicle, a driver parks the vehicle in a parking lot and completes the parking toward a regularly formed parking space by rotating a steering wheel and moving the vehicle. A normal driver feels more difficulty in driving when parking a vehicle than when driving the vehicle. Specially, when a parking space is narrow or a driver's view is not secured, such as in a state in which the driver cannot recognize objects around the driver at night, the driver feels larger difficulty.

In order to assist parking by the driver, an automatic parking system (Smart Parking Assist System: SPAS) in which the vehicle automatically controls parking has been researched, developed, and applied to the vehicle.

The automatic parking system (SPAS) recognizes a parking space through a sensor installed in the vehicle and performs control such as steering, acceleration, and deceleration required for moving the vehicle to the recognized parking space.

The conventional automatic parking system (SPAS) sets a parking space and uses an ultrasonic sensor for detecting obstacles located with the parking space. However, the ultrasonic sensor has a problem in that an obstacle (for example, a stopper, a curb, or a bump on the road) equal to or smaller than a predetermined height within the parking space cannot be detected.

When the automatic parking system (SPAS) controls automatic parking in the state in which the ultrasonic sensor cannot detect an obstacle equal to or smaller than a predetermined height that is located within a parking space, the automatic parking cannot be completely controlled due to the obstacle equal to or smaller than the predetermined height that is not detected.

For example, in perpendicular parking, a termination condition for terminating automatic parking is set when the vehicle enters a predetermined depth of a target parking space. If the vehicle is caught by a stopper and does not reach the predetermined depth, the automatic parking control is not terminated and information thereon is not provided to a driver, so that the driver experiences great inconvenience. In parallel parking, when the vehicle performs the automatic parking control without detection of a curb or a bump on the road, wheels may be damaged by the bump on the road or dangerous situations may occur like the wheels of the vehicle go over the bump on the road.

Accordingly, when an obstacle equal to or smaller than a predetermined height that is not detected by an ultrasonic sensor is located within a parking space, the automatic parking system (SPAS) for controlling automatic parking using an ultrasonic sensor is required to compensate for a method of controlling the automatic parking.

SUMMARY OF THE INVENTION

An aspect of the present embodiments is to provide an automatic parking system and method for detecting whether there is an obstacle equal to or smaller than a predetermined height, which is not detected by a sensor, within a parking space in a process of controlling automatic parking of a vehicle by an automatic parking system and adjusting and performing automatic parking control according to the presence or the absence of the obstacle equal to or smaller than the predetermined height.

Another aspect of the present embodiments is to provide an automatic parking system and method for, in determination of whether there is an obstacle equal to or smaller than a predetermined height that is not detected by a sensor, distinguishing the type of obstacles equal to or smaller than the predetermined height and performing automatic parking control according to the type.

In accordance with an aspect of the present disclosure, an automatic parking system is provided. The automatic parking system includes: a parking space setter configured to set a parking space for automatic parking of a vehicle based on information acquired through a sensor of the vehicle; an obstacle determiner configured to determine whether there is an obstacle equal to or smaller than a predetermined height that has not been detected through the sensor of the vehicle based on one or more pieces of information on a target speed, a movement speed, and engine driving torque of the vehicle while the automatic parking of the vehicle is controlled; a parking space adjustor configured to adjust the set parking space when it is determined that there is the obstacle equal to or smaller than the predetermined height by the obstacle determiner; and an automatic parking controller configured to control the automatic parking of the vehicle toward the parking space set by the parking space setter or the parking space adjustor.

In the automatic parking system, when a difference between the target speed and the movement speed of the vehicle exists and the difference is maintained for a predetermined time or longer or when additional primary engine driving torque is generated by the difference and the vehicle is in a stopped state, the obstacle determiner may determine that there is the obstacle equal to or smaller than the predetermined height that is not detected by the sensor, and, when it is determined that there is the obstacle equal to or smaller than the predetermined height, re-identify the presence of the obstacle equal to or smaller than the predetermined height by reducing and then increasing the additional primary engine driving torque according to the difference between the target speed and the movement speed of the vehicle, or re-identify the presence of the obstacle by making driving torque generated by applying a weighted value to the primary engine driving torque according to the difference between the target speed and the movement speed of the vehicle after reducing the primary engine driving torque.

Further, when movement of the vehicle detected by a wheel direction sensor of the vehicle is performed in a direction opposite to a driving direction of the vehicle in the state in which the additional primary engine driving torque according to the difference between the target speed and the movement speed of the vehicle is generated in the driving direction of the vehicle, it may be determined that there is the obstacle equal to or smaller than the predetermined height.

In the automatic parking system, the automatic parking controller controls the automatic parking of the vehicle toward a preset parking space when the target speed and the movement speed of the vehicle are the same as each other after the obstacle determiner re-identifies the presence of the obstacle equal to or smaller than the predetermined height that is not detected by the sensor, and, when it is determined that there is the obstacle equal to or smaller than the predetermined height, controls the automatic parking of the vehicle according to the parking space reset by the parking space adjustor or the automatic parking termination condition.

In accordance with another aspect of the present disclosure, an automatic parking method is provided. The automatic parking method includes: setting a parking space based on information acquired through a sensor of a vehicle; controlling automatic parking of the vehicle toward the set parking space; determining whether there is an obstacle equal to or smaller than a predetermined height that has not been detected through the sensor of the vehicle based on one or more pieces of information on a target speed, a movement speed, and engine driving torque of the vehicle while the automatic parking of the vehicle is controlled; and adjusting the set parking space when it is determined that there is the obstacle equal to or smaller than the predetermined height.

According to the present embodiments, it is possible to determine whether there is an obstacle, and control and complete automatic parking of the vehicle according to the determination even when there is an obstacle equal to or smaller than a predetermined height, which is not detected by a sensor, within a parking space or on a movement path to the parking space while the automatic parking control is performed by the automatic parking system.

According to the present embodiments, it is possible to distinguish types of obstacles equal to or smaller than a predetermined height through a process of re-identifying the obstacles and perform automatic parking control when it is determined that there is the obstacle equal to or smaller than the predetermined height that is not detected by the sensor.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
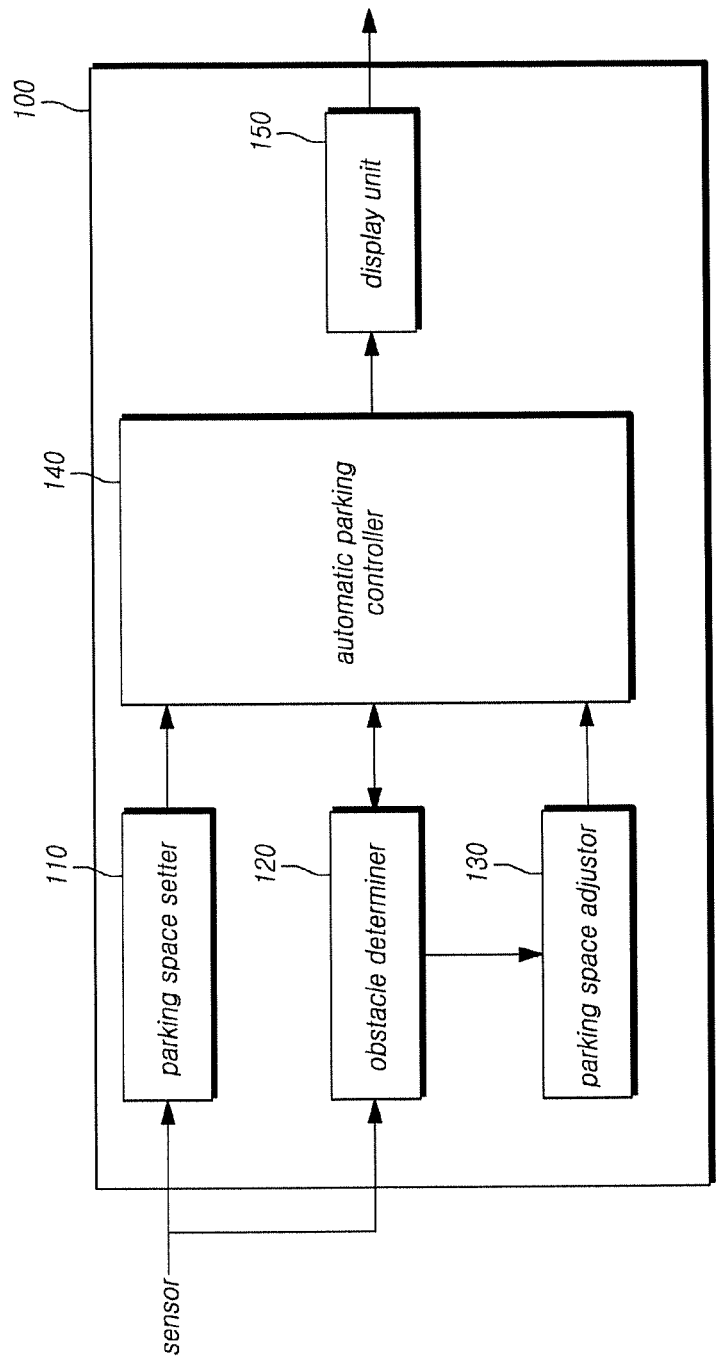
FIG. 1 is a block diagram illustrating the configuration of an automatic parking system according to the present embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a block diagram illustrating a configuration of an automatic parking system 100 according to the present embodiments.

Referring to FIG. 1, the automatic parking system 100 includes a parking space setter 110, an obstacle determiner 120, a parking space adjustor 130, an automatic parking controller 140, and a display unit 150.

The parking space setter 110 sets a parking space for automatic parking of a vehicle based on information acquired through a sensor installed in the vehicle and transmits information on the set parking space to the automatic parking controller 140.

When a driver makes the vehicle enter an automatic parking mode, the parking space setter 110 searches for a parking space through the sensor installed in the vehicle.

Obstacles such as vehicles located within the surroundings of the vehicle are detected through an ultrasonic sensor, a radar sensor, and a camera installed to the vehicle, and a parking space in which the vehicle can be parked may be set based on information on locations of the detected obstacles and distances from the obstacles.

The ultrasonic sensor may be generally used as a vehicle sensor for searching for the parking space by the parking space setter 110, but is not limited thereto, and any sensor that can detect information (for example, an obstacle location) on a search for a parking space through a radar sensor, a Lidar sensor, and a camera may be used.

When the setting of the parking space is completed, the parking space setter 110 transmits information on the set parking space to the automatic parking controller 140 to allow the automatic parking to be performed by the automatic parking controller 140, and the automatic parking controller 140 may provide information on the set parking space and information on a current automatic parking control state to the driver through the display unit 150 to allow the driver to recognize the automatic parking control state.

When the parking space cannot be set due to the presence of an obstacle located within the surroundings of the vehicle or when the parking by the automatic parking control cannot be completed, such information may be transmitted to the automatic parking controller 140 and provided to the driver through the display unit 150, so that the driver can perform automatic parking in another space or manually perform the parking.

The obstacle determiner 120 detects obstacles existing on the set parking space or a moving path of the vehicle while the automatic parking controller 140 performs the automatic parking control according to the parking space set by the parking space setter 110 and transmits information on the detected obstacles to the parking space adjustor 130 and the automatic parking controller 140.

That is, according to the present embodiments, it is possible to continuously detect whether there is an obstacle equal to or smaller than a predetermined height, which was not detected in the initial parking space setting, during a process of controlling the automatic parking in the initially set parking space and to enable the automatic parking control to be smoothly completed based on the detected information.

Further, it is possible to prevent completion of the automatic parking due to the obstacle equal to or smaller than the predetermined height, located within the parking space or the moving path by identifying whether there is the obstacle (for example, a stopper, a curb, or a bump on the road) equal to or smaller than the predetermined height, which has not been detected through the sensor of the vehicle.

The obstacle determiner 120 may determine whether there is an obstacle equal to or smaller than the predetermined height, which has not been detected through the sensor of the vehicle, based on a difference between a target speed that is a movement speed for the automatic parking of the vehicle and an actual movement speed according to a current movement of the vehicle.

In this specification, the "obstacle equal to or smaller than the predetermined height" is an obstacle having a height shorter than a threshold height that can be detected as a normal obstacle while the sensor searches for a parking space or the parking is performed and may include a fixed obstacle such as a parking stopper, a curb, or a bump on the road}, but is not limited thereto, and corresponds to a concept including a temporary obstacle equal to or smaller than a threshold height, such as a rock, stone or can.

The obstacle equal to or smaller than the predetermined height is not detected by the sensor and thus is overlooked during the normal parking space search and automatic parking process. However, the obstacle may actually interrupt the movement of the vehicle during the automatic parking process, thereby causing some errors in the automatic parking control.

The obstacle determiner 120 receives, from the automatic parking controller 140, a target speed at which the vehicle moves according to the automatic parking control while the automatic parking control is performed by the automatic parking controller 140. Further, the obstacle determiner 120 receives an actual movement speed according to the current movement of the vehicle from a vehicle speed sensor installed in the vehicle.

In addition, the obstacle determiner 120 may further receive current engine driving torque information from an engine driving control unit.

The obstacle determiner 120 determines whether there is an obstacle equal to or smaller than a predetermined height, which has not been detected by the sensor of the vehicle, based on one or more pieces of information on the target speed, the movement speed, and the engine driving torque of the vehicle received during the automatic parking control.

Although a method of determining whether there is an obstacle equal to or smaller than a predetermined height may include the following three methods, it is not limited thereto and a combination of the three methods or a method using the target speed, the actual movement speed, and the engine torque information may be implemented.

When there is a difference between the target speed and the movement speed of the vehicle and the difference is maintained for a predetermined time or longer, it may be determined that there is an obstacle equal to or smaller than a predetermined height. When there is a difference between the target speed and the movement speed of the vehicle and there is primary engine driving torque additionally generated by the difference, it may be determined that there is an obstacle equal to or smaller than a predetermined height. Alternatively, when there is primary engine driving torque additionally generated by the difference between the target speed and the movement speed of the vehicle and the vehicle stops for a predetermined time or longer, it may be determined that there is an obstacle equal to or smaller than a predetermined height.

When it is identified that there is a difference between the target speed determined during the automatic parking process and the actual movement speed of the vehicle, the parking system generates additional primary engine driving torque larger than target engine driving torque in order to compensate for the speed difference and controls the vehicle according to the generated driving torque.

In this specification, under such a condition, additional engine driving torque larger than the target engine driving torque determined to initially support the parking is expressed as primary engine driving torque or secondary engine driving torque generated by the difference between the target speed and the movement speed of the vehicle.

That is, in the state in which the target engine driving torque, which is set during the automatic parking process having no obstacle in the driving path, is T, a target speed V and an actual movement speed V' have a difference therebetween due to an obstacle equal to or smaller than a predetermined height and additional engine driving torque LT, which is additionally applied to compensate for the difference, is further applied, wherein the additional engine driving torque $\Delta T$ is expressed as primary engine driving torque.

When there is still the difference between the target speed and the movement speed in spite of the performance of the vehicle control based on the generated additional primary engine driving torque $\Delta T$, it may be determined that the vehicle is caught on the obstacle equal to or smaller than the predetermined height.

That is, when there is the difference between the target speed and the movement speed of the vehicle, when there is still the difference between the target speed and the movement speed after additional primary engine driving torque is generated due to the difference and the difference is maintained for a predetermined time (for example, 2 seconds) or longer, or when the vehicle stops in spite of the generation of the additional primary engine driving torque, the obstacle determiner 120 may determine that the vehicle is caught on the obstacle equal to or smaller than the predetermined height while moving for the automatic parking.

For example, in the process of controlling the automatic parking of the vehicle toward the parking space set by the parking space setter 110, even though the target speed of the vehicle is 2 km/h, the movement speed of the vehicle may be 0 km/h since the vehicle is caught on the obstacle. Accordingly, a difference between the target speed and the movement speed may be generated, and the movement of the vehicle may be controlled by generating additional primary engine driving torque of 500 N·m due to the difference.

When the difference between the target speed and the movement speed still exists although the primary engine driving torque according to the difference between the target, speed and the movement speed is generated and the movement of the vehicle is controlled based on the primary engine driving torque and when the difference is maintained for 2 seconds or longer or the vehicle stops, it is determined that the vehicle is caught on the obstacle equal to or smaller than the predetermined height and thus the automatic parking control to the set parking space cannot be completed.

Alternatively, whether there is the obstacle in the movement path of the vehicle may be determined based on movement of the vehicle detected by a wheel direction sensor of the vehicle in the state in which the additional primary engine driving torque according to the difference between the target speed and the movement speed is generated.

For example, when the movement of the vehicle detected by the wheel direction sensor of the vehicle is performed in a direction opposite to a driving direction of the vehicle in the state in which the additionally primary engine driving torque provided by the difference between the target speed and the movement speed of the vehicle is generated in the driving direction of the vehicle, it may be determined that there is the obstacle.

Accordingly, according to the present embodiments, when there is the obstacle equal to or smaller than the predetermined height, which has not been detected by the sensor installed in the vehicle, in the movement path, it may be determined whether there is the obstacle equal to or smaller than the predetermined height based on information on a vehicle control state and a movement state acquired by the sensor installed in the vehicle (target speed, actual movement speed, and engine driving torque information of the vehicle).

When it is determined that there is the obstacle equal to or smaller than the predetermined height while the vehicle moves by the automatic parking control, the obstacle determiner 120 transmits information on the obstacle equal to or smaller than the predetermined height to the parking space adjustor 130 and the automatic parking controller 140.

Further, the obstacle determiner 120 estimates the location of the obstacle equal to or smaller than the predetermined height from the current location of the vehicle along with information indicating the presence of the obstacle equal to or smaller than the predetermined height, and transmits information on the estimated obstacle location to the parking space adjustor 130 and the automatic parking controller 140.

The parking space adjustor 130 adjusts the set parking space or changes an automatic parking termination condition according to the received information on the obstacle equal to or smaller than the predetermined height and transmits it to the automatic parking controller 140, and the automatic parking controller 140 controls the automatic parking of the vehicle according to the adjusted parking space or the automatic parking termination condition. Information on the changed automatic parking is provided to the driver through the display unit 150.

At this time, the obstacle equal to or smaller than the predetermined height, determined by the obstacle determiner 120 may be a stopper located within the initially set parking space or may be a speed bump located in the moving path to the set parking space. In the state in which the vehicle cannot go over the speed bump, even though the additional primary engine driving torque according to the difference between the target speed and the movement speed is applied, the vehicle may not move. In this case, the automatic parking of the vehicle may not be properly completed due to the speed bump, and the present embodiments provide a process of re-identifying an obstacle in order to solve the problem.

When the difference between the target speed and the movement speed is maintained for a preset time or longer after the additional primary engine driving torque according to the difference between the target speed and the movement speed of the vehicle is generated, the obstacle determiner 120 may primarily determine that the vehicle is caught on the obstacle equal to or smaller than the predetermined height.

When it is primarily determined that the vehicle is caught on the obstacle equal to or smaller than the predetermined height, the obstacle equal to or smaller than the predetermined height is re-identified by reducing and then increasing the primary engine driving torque according to the difference between the target speed and the movement speed.

For example, whether there is the obstacle equal to or smaller than the predetermined height is re-identified by reducing the primary engine driving torque of 500 N·m according to the difference between the target speed and the movement speed by a predetermined degree and then increasing back to 500 N·m.

At this time, if it is identified that the vehicle moves through the process of reducing and then increasing the primary engine driving torque, it means that the primarily determined obstacle is an obstacle located in the movement path of the vehicle, such as a speed bump, or an obstacle that does not influence the completion of the vehicle's parking, so that the automatic parking of the vehicle is performed toward to the initially set parking space without any adjustment of the parking space.

That is, when the target speed and the movement speed of the vehicle become the same as each other after the re-identification process of reducing and then increasing the primary engine driving torque, it is determined that the vehicle passes through the obstacle equal to or smaller than the predetermined height and the automatic parking process toward the preset parking space continues. When there is still the difference between the target speed and the movement speed of the vehicle even after the re-identification process of reducing and then increasing the primary engine driving torque, the set parking space may be controlled according to the location of the obstacle equal to or smaller than the predetermined height or the automatic parking termination condition may be changed.

Further, in the process of reducing and then increasing the engine driving torque, the obstacle may be re-identified by generating secondary engine driving torque that is generated by applying a weighted value to determine the re-identification to the primary engine driving torque according to the difference between the target speed and the movement speed.

That is, it is possible to re-identify the presence of the obstacle equal to or smaller than the predetermined height by generating the secondary engine driving torque that is generated by applying a predetermined weighted value to the primary engine driving torque according to the difference between the target speed and the movement speed of the vehicle after the engine driving torque is reduced.

For example, even though the primary engine driving torque according to the difference between the target speed and the movement speed is generated, the generated primary engine driving torque is reduced by a predetermined value, and then the secondary engine driving torque larger than the primary engine driving torque is applied, the vehicle cannot pass over the speed bump and is continuously in the stopped state when a height of the speed bump is too tall. In this case, the vehicle may recognize the speed bump located in the moving path to the parking space as a stopper and thus complete the automatic parking control in a wrong parking space.

Accordingly, a method of re-identifying the obstacle equal to or smaller than the predetermined height may be used by controlling movement of the vehicle through the application of the secondary engine driving torque larger than the primary engine driving torque, which is generated by applying the weighted value to the primary engine driving torque in the process of re-identifying the obstacle equal to or smaller than the predetermined height.

For example, when the primary engine driving torque according to the difference between the target speed and the movement speed is 500 N·m, a second engine driving torque of 550 N·m, which is generated by applying a weighted value of 50 N·m to the primary engine driving torque of 500 N·m in the process of reducing and then increasing the primary engine driving torque by a predetermined value, may be applied. At this time, the second engine driving torque to which the weighted value is applied must have a size small enough that the vehicle does not pass over a normal obstacle, such as a stopper or a curb, which should not be passed over, but, by applying the secondary engine driving torque to which the weighted value is applied, the vehicle should be able to pass over a speed bump and move to the set parking space, even in a case where the speed bump is slightly tall.

When the obstacle determiner 120 determines that there is the obstacle equal to or smaller than the predetermined height during the movement to the set parking space, the parking space adjustor 130 adjusts the set parking space or changes the parking termination condition based on the location of the obstacle equal to or smaller than the predetermined height and transmits the adjust parking space or the changed parking termination condition to the automatic parking controller 140.

For example, the parking space adjustor 130 may adjust and reset the parking space to terminate the automatic parking of the vehicle at a position where the stopper is located in consideration of the location of the stopper, which is the obstacle equal to or smaller than the predetermined height, and may adjust the parking termination condition from 100% to 80% of a set parking space depth.

That is, in the normal state, when the vehicle enters 100% of the parking space depth, when the termination condition under which it is determined that the automatic parking is terminated is set, and when the obstacle equal to or smaller than the predetermined height according to the present embodiment is detected in a deep part of the parking space, the parking termination condition may be adjusted from 100% to 80% of the parking space depth.

The automatic parking controller 140 controls the automatic parking of the vehicle based on information received from the obstacle determiner 120 and the parking space adjustor 130, and, when the obstacle equal to or smaller than the predetermined height is detected or the initially set parking space is reset due to the detection of the obstacle equal to or smaller than the predetermined height, the information is provided to the driver through the display unit 150.

When the obstacle equal to or smaller than the predetermined height is detected by the obstacle determiner 120 but the detected obstacle is an obstacle that does not influence the parking termination condition (for example, a speed bump on the movement path), the automatic parking controller 140 controls the automatic parking of the vehicle toward the initially set parking space and provides only information on the detected obstacle equal to or smaller than the predetermined height to the driver.

Meanwhile, the parking space setter 110, the obstacle determiner 120, the parking space adjustor 130, and the automatic parking controller 140 included in the automatic parking system 100 according to the present embodiment described above may be implemented as an integrated control device installed in the vehicle or a partial module of an ECU.

The integrated control device or the ECU of the vehicle may include storage devices, such as a processor and a memory, and a computer program for performing a particular function, and the parking space setter 110, the obstacle determiner 120, the parking space adjustor 130, and the automatic parking controller 140 may be implemented as software modules capable of performing unique functions.

Further, the vehicle sensor linked to the parking space setter 110 included in the automatic parking system 100 of the driving support device according to the present embodiment may include an ultrasonic sensor, a radar sensor, and a camera sensor, and the display unit 150 may be implemented as a display device, such as an LCD or an OLED, or a head-up display.

According to the present embodiments, even though an obstacle equal to or smaller then a predetermined height, which is not detected by a sensor of the vehicle, exists in a movement path to a parking space in a process of controlling automatic parking of the vehicle, it is possible to identify whether the obstacle exists, and the type and location of the obstacle through a process of determining and re-identifying the obstacle and to perform automatic parking control, thereby smoothly completing the automatic parking control even when the obstacle equal to or smaller than the predetermined height, which is not detected by the sensor but influences settings of the parking space, exists.

Figure 2:
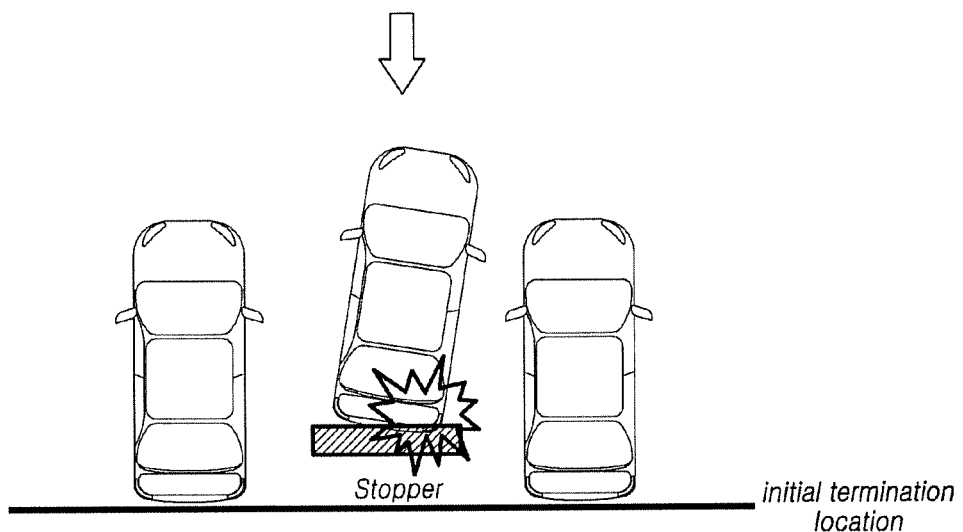
FIGS. 2 to 5 illustrate examples of automatic parking control by an automatic parking system according to the present embodiments.
Figure 3:
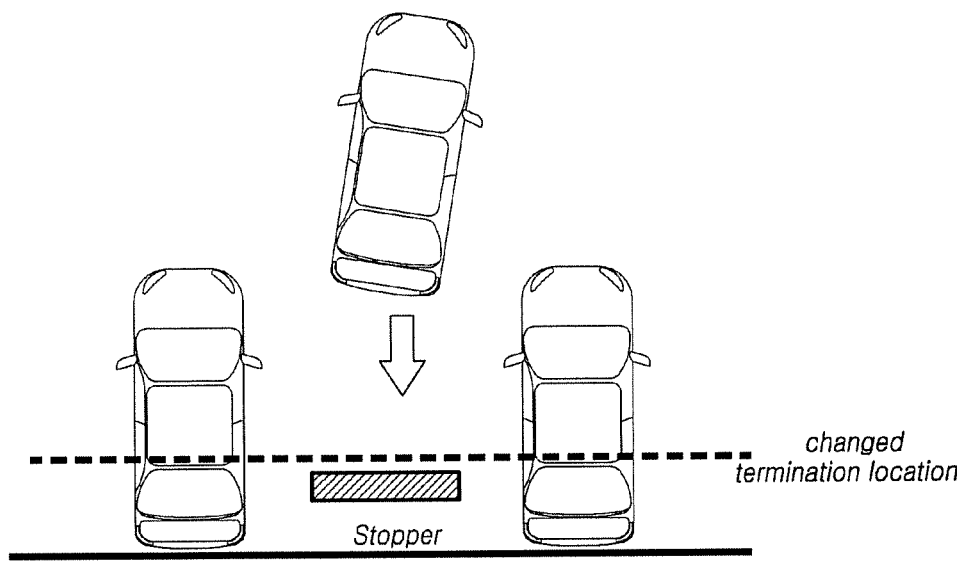
Figure 4:
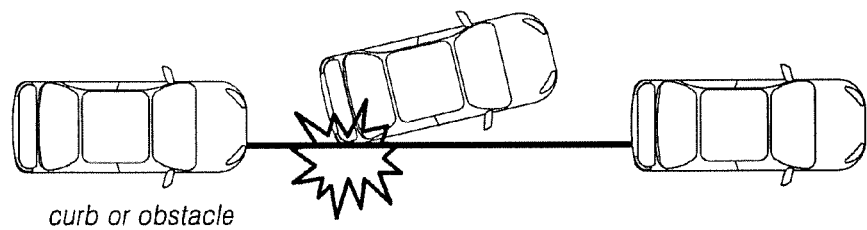
Figure 5:
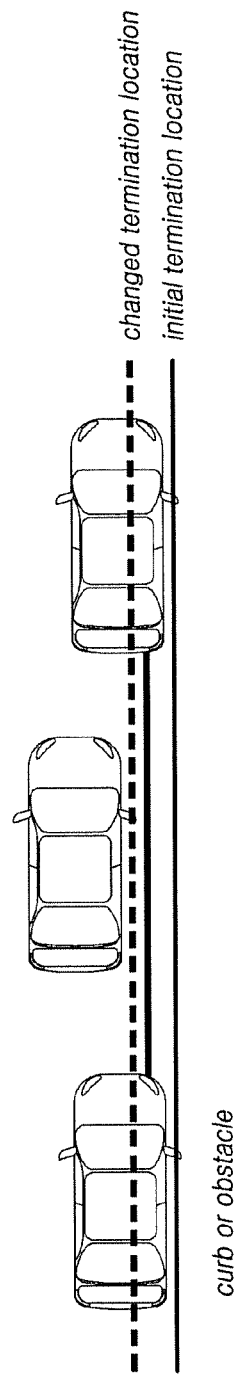

FIGS. 2 to 5 illustrate examples in which the automatic parking system 100 according to the present embodiments detects an obstacle equal to or smaller than a predetermined height, and adjusts and performs automatic parking control. FIGS. 2 and 3 illustrate examples of the case in which perpendicular parking is attempted, and FIGS. 4 and 5 illustrate examples of the case in which parallel parking is attempted.

Referring to FIGS. 2 and 3, FIG. 2 illustrates a process of controlling automatic parking according to an initially set parking space, and FIG. 3 illustrates a process of controlling automatic parking according to a changed parking space after a stopper, which is an obstacle equal to or smaller than a predetermined height, is detected.

When the vehicle enters an automatic parking mode, the automatic parking system 100 detects obstacles around the vehicle through a sensor installed in the vehicle and sets a parking space for automatic parking of the vehicle based on the detected obstacle information.

When the parking space is set, the automatic parking system 100 moves the vehicle to the set parking space while controlling steering and deceleration/acceleration of the vehicle.

At this time, as illustrated in FIG. 2, a stopper corresponding to an obstacle equal to or smaller than a predetermined height, which has not been detected by the sensor of the vehicle may be located in the initially set parking space.

When the vehicle reaches the obstacle equal to or smaller than the predetermined height, which has not been detected in the initially set parking space, the vehicle is in a state in which a target speed for movement to the parking space is generated since the vehicle has not completely reached the set parking space. Further, since wheels of the vehicle are caught on the stopper, an actual movement speed is 0 km/h.

When a difference between the target speed and the movement speed of the vehicle is detected, the automatic parking system 100 generates primary engine driving torque according to the difference between the target speed and the movement speed and controls movement of the vehicle based on the generated driving torque.

Further, in order to re-identify whether there is a detected obstacle equal to or smaller than a predetermined height and the type of obstacle, the automatic parking system 100 may control movement of the vehicle by reducing and then increasing the engine driving torque.

At this time, it is possible to control movement of the vehicle by generating secondary engine driving torque that is generated by applying a weighted value to the primary engine driving torque in a process of reducing and then increasing the primary engine driving torque.

When the vehicle is in a stopped state even though the generation of the additional engine driving torque according to the difference between the target speed and the movement speed is maintained for a predetermined time or longer, the automatic parking system 100 determines that the obstacle equal to or smaller than the predetermined height, which is not detected by the sensor, exists at the corresponding position, and resets the initial parking space based on the presence of the determined obstacle equal to or smaller than the predetermined height and information on the location.

FIG. 3 illustrates an automatic parking process according to the reset parking space in which the initially set parking space is reset according to the location of the stopper, which is the detected obstacle equal to or smaller than the predetermined height, and automatic parking toward the reset parking space is controlled.

Accordingly, even when the obstacle equal to or smaller than the predetermined height exists in the movement path to the parking space or within the parking space in the process of controlling automatic parking, errors occurring during the automatic parking control may be prevented and the automatic parking control maybe completed by controlling the automatic parking through detecting the presence of the obstacle and resetting the parking space based on the detected information.

Referring to FIGS. 4 and 5, FIGS. 4 and 5 illustrate examples of the case in which a curb exists in a process of attempting parallel parking. FIG. 4 illustrates a process of controlling automatic parking according to an initially set parking space and FIG. 5 illustrates a process of controlling automatic parking according to a reset parking space after the curb, which is an obstacle equal to or smaller than a predetermined height, is detected.

When the vehicle enters an automatic parking mode, the automatic parking system 100 detects obstacles, such as vehicles located around the vehicle through a sensor of the vehicle and sets a parking space of the vehicle based on the detected information so as to control automatic parking of the vehicle.

As illustrated in FIG. 4, when there is a curb corresponding to an obstacle equal to or smaller than a predetermined height, which was not detected when an initial parking space is set in the process of controlling automatic parking, the vehicle cannot complete the automatic parking and cannot move in the state in which the vehicle reaches the curb.

When there is a difference between a target speed and a movement speed of the vehicle, the automatic parking system 100 generates primary engine driving torque according to the difference to control movement of the vehicle, and, when the vehicle is in the stopped state or the stopped state is maintained for a predetermined time or longer even though the generated engine driving torque is applied, determines that there is an obstacle equal to or smaller than a predetermined height, which has not been detected through the sensor.

At this time, the presence or the absence of the obstacle equal to or smaller than the predetermined height may be identified through a re-identification process of reducing and then increasing engine driving torque, and a weighted value may be applied to the driving torque in the process of increasing the engine driving torque.

When it is identified that there is the obstacle equal to or smaller than the predetermined height in the process of re-identifying the obstacle equal to or smaller than the predetermined height, the automatic parking system 100 adjusts the initially set parking space or changes the automatic parking completion condition, and performs automatic parking control according to the changed parking space or automatic parking completion condition.

Accordingly, when the presence of the curb corresponding to the obstacle equal to or smaller than the predetermined height, which has not been detected through the sensor of the vehicle within the parking space is identified during the automatic parking control toward the initially set parking space as illustrated in FIG. 4, it is possible to complete the automatic parking control of the vehicle even though there is the curb, which has not been detected through the sensor of the vehicle, by performing the automatic parking control of the vehicle from the initial automatic parking termination location to the changed automatic parking termination location as illustrated in FIG. 5.

Figure 6:
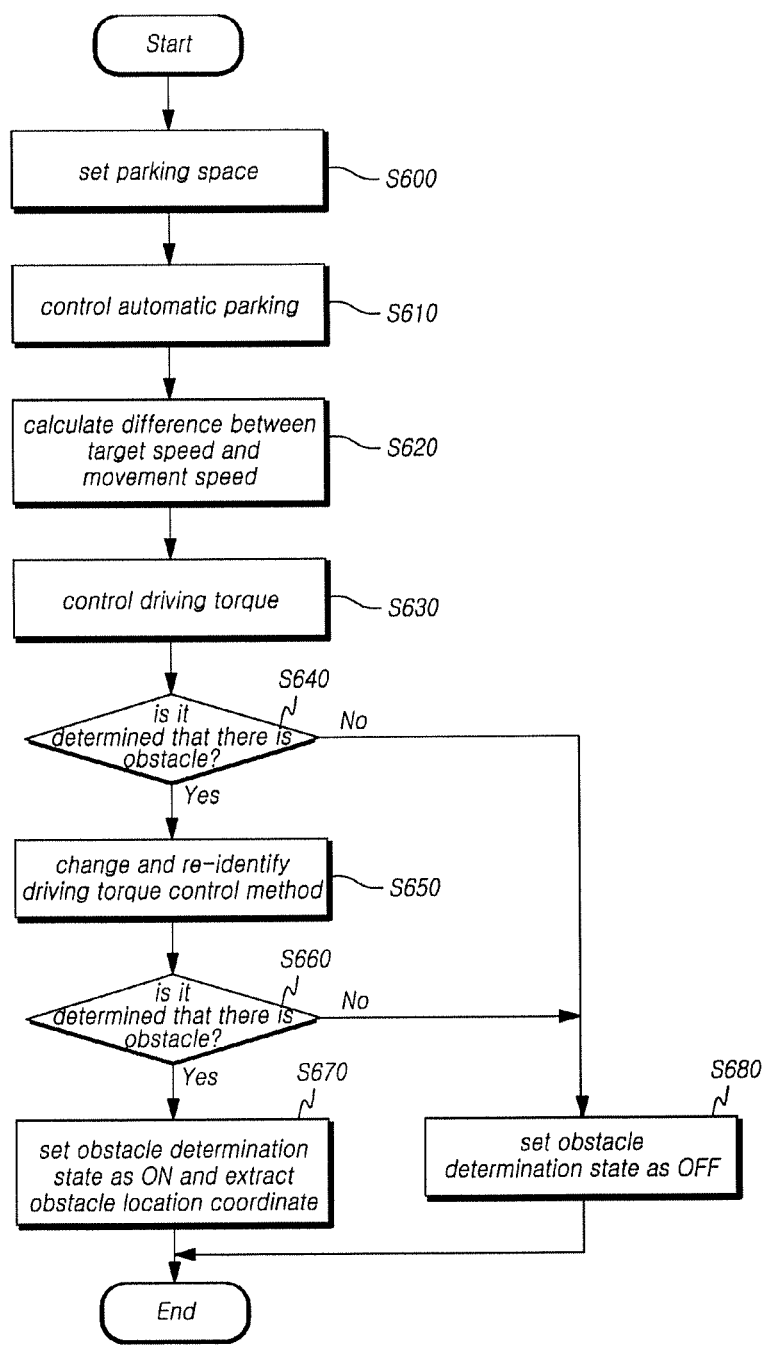
FIGS. 6 to 8 are flowcharts illustrating a process of an automatic parking method according to the present embodiments.
Figure 7:
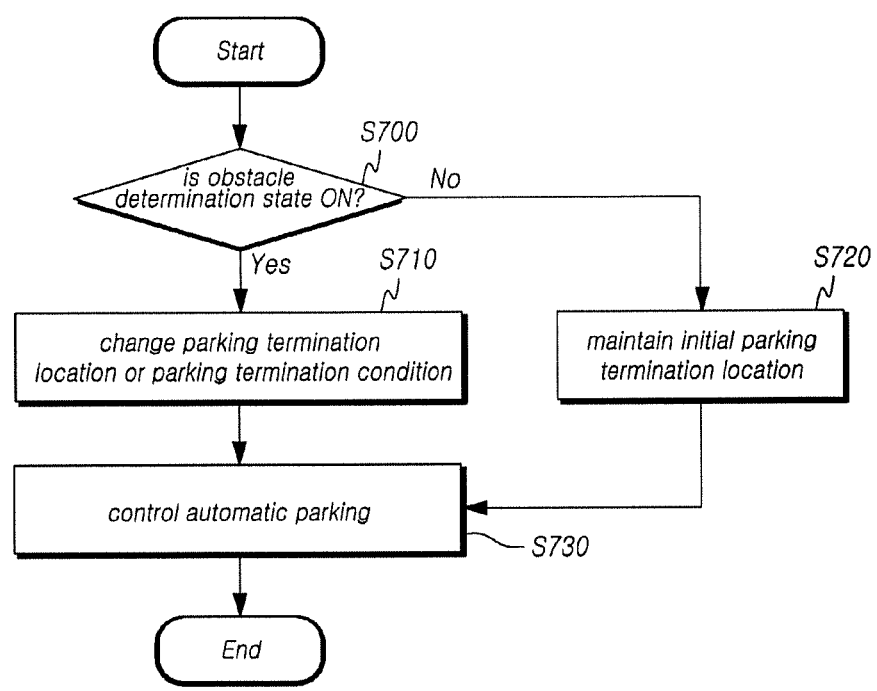
Figure 8:
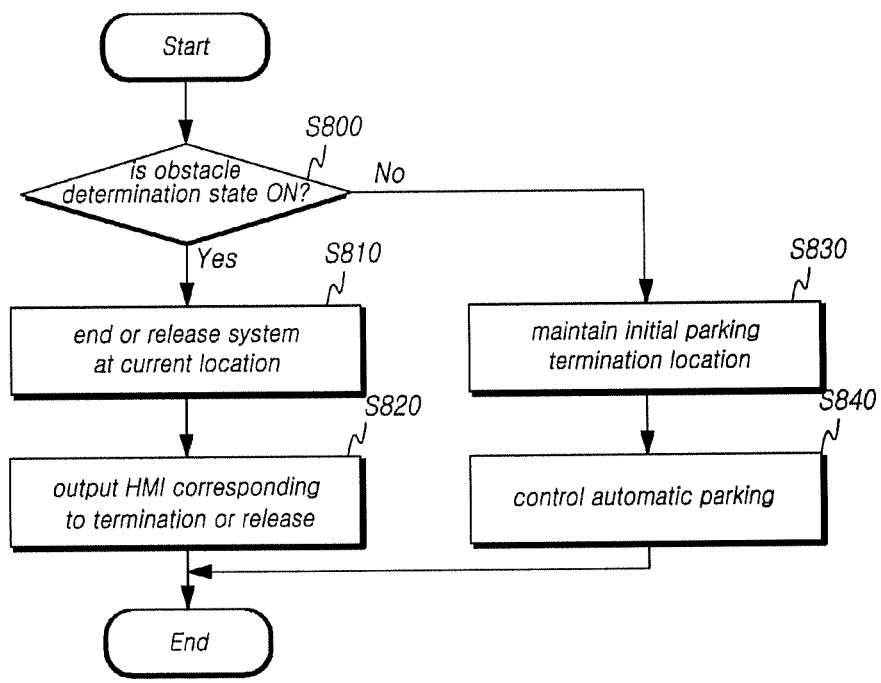

FIGS. 6 to 8 illustrate a process of an automatic parking method according to the present embodiments. FIG. 6 illustrates a process in which the automatic parking system 100 determines whether there is an obstacle equal to or smaller than a predetermined height, which has not been detected by a sensor of the vehicle, and FIGS. 7 and 8 illustrate a method of performing automatic parking control when the obstacle equal to or smaller than the predetermined height is detected.

Referring to FIG. 6, when the vehicle enters an automatic parking mode, the automatic parking system 100 detects obstacles located around the vehicle through the sensor of the vehicle and sets a parking space for parking of the vehicle in S600.

When the parking space is set, the automatic parking system 100 controls automatic parking of the vehicle toward the set parking space in S610, and calculates a difference between a target speed and a movement speed of the vehicle during the automatic parking control in S620. When the difference between the target speed and the movement speed exists, the automatic parking system 100 controls movement of the vehicle by generating additional primary engine driving torque according to the difference in S630.

When the vehicle does not move or when the state in which the vehicle does not move is maintained for a predetermined time or longer even though the additional primary engine driving torque according to the difference between the target speed and the movement speed is generated, that is, when the difference between the target speed and the movement speed exists or when the difference is maintained for a predetermined time or longer in the state in which the additional primary engine driving torque is generated, the automatic parking system 100 determines that the obstacle equal to or smaller than the predetermined height, which has not been detected through the sensor, exists at a position where wheels of the vehicle are currently located in S640.

When it is determined that there is the obstacle equal to or smaller than the predetermined height, the automatic parking system 100 re-identifies the presence of the obstacle while reducing and then increasing the primary engine driving torque in S650.

At this time, the process of re-identifying the obstacle equal to or smaller than the predetermined height is to distinguish between an obstacle (a stopper or a curb) located within the parking space, which influences the parking space setting of the vehicle, and an obstacle (for example, a speed bump) located in the movement path of the vehicle, which does not influence the parking space setting, and secondary engine driving toque generated by applying a weighted value to the primary engine driving torque may be used when the engine driving torque is increased.

When it is identified that there is the obstacle equal to or smaller than the predetermined height in the process of re-identifying the obstacle equal to or smaller than the predetermined height through the change in the engine driving torque in S660, the automatic parking system 100 sets a determination state of the obstacle equal to or smaller than the predetermined height as ON and extracts a location coordinate of the obstacle equal to or smaller than the predetermined height in S670. When movement of the vehicle is identified after the process of re-identifying the obstacle equal to or smaller than the predetermined height, that is, when the target speed and the movement speed of the vehicle become the same as each other after the process of re-identifying the obstacle equal to or smaller than the predetermined height, the corresponding obstacle may be considered as an object, which is not a stopper, so that the automatic parking system 100 sets the obstacle determination state as OFF and continuously performs the automatic parking control.

FIGS. 7 and 8 illustrate a process of automatic parking control after the automatic parking system 100 determines whether there is an obstacle equal to or smaller than a predetermined height.

Referring to FIG. 7, when a determination state of the obstacle equal to or smaller than the predetermined height becomes ON in S700, the automatic parking system 100 resets the initially set automatic parking space or changes the automatic parking completion condition based on a location coordinate of the corresponding obstacle in S710.

For example, the automatic parking system 100 may reset a parking space termination position based on the location of the obstacle equal to or smaller than the predetermined height or change the automatic parking completion condition from 100% to 80% in consideration of the location of the obstacle.

The automatic parking system 100 performs automatic parking control according to the reset parking space or parking termination condition in S730, and, when the obstacle determination state is OFF, controls movement of the vehicle to the initially set parking space to complete the automatic parking control in S740.

FIG. 8 illustrates another embodiment of the automatic parking control by the automatic parking system 100 in determination of the obstacle. When the obstacle determination state becomes ON in S800, the automatic parking system 100 is ended or released at the current location of the vehicle in S810.

Further, a message indicating the termination of the automatic parking system 100 due to the presence of the obstacle equal to or smaller than the predetermined height is output to the driver in S820, and the driver may complete the parking.

At this time, the obstacle determination state is OFF, the initial parking termination location is maintained in S830, and the automatic parking control of the vehicle is performed in S840.

According to the present embodiments, it is possible to complete the automatic parking control even though there is an obstacle, which is not detected by a sensor of the vehicle, by determining the presence of the obstacle equal to or smaller than a predetermined height during the automatic parking control of the vehicle and changing and performing the automatic parking control according to the determination. Further, it is possible to complete the parking without panic of a driver in the state, in which the vehicle cannot move due to the obstacle equal to or smaller than the predetermined height during the automatic parking control, by providing information on the presence of the obstacle equal to or smaller than the predetermined height and information on the current control state of the vehicle.

Although the exemplary embodiments of the present disclosure have been described for illustrative purposes, those skilled in the art will appreciate that various modifications and substitutions are possible, without departing from the scope and spirit of the disclosure as disclosed in the accompanying claims. Therefore, the exemplary embodiments disclosed in the present disclosure are intended to illustrate the scope of the technical idea of the present disclosure, and the scope of the present disclosure is not limited by the exemplary embodiments.

What is claimed is:

1. An automatic parking system comprising:
   a parking space setter configured to set a parking space for automatic parking of a vehicle based on information acquired through a sensor of the vehicle;
   an obstacle determiner configured to determine whether there is an obstacle having a height shorter than a threshold height detectable by the sensor of the vehicle as an obstacle based on one or more pieces of information on a target speed, a movement speed, and engine driving torque of the vehicle while the automatic parking of the vehicle is controlled;
   a parking space adjustor configured to adjust the set parking space when it is determined that there is the obstacle equal to or smaller than the threshold height by the obstacle determiner; and
   an automatic parking controller configured to control the automatic parking of the vehicle toward the parking space set by the parking space setter or the parking space adjustor,
   wherein the obstacle determine is further configured to determine that there is an obstacle having a height equal to or smaller than the threshold height when movement of the vehicle detected by a wheel direction sensor of the vehicle is in a direction opposite to a driving direction in a state in which an additional primary engine driving torque according to a difference between the target speed and the movement speed of the vehicle is generated in the direction in which the vehicle is being driven.

2. The automatic parking system of claim 1, wherein the obstacle determiner determines that there is the obstacle equal to or smaller than the threshold height when the difference between the target speed and the movement speed of the vehicle is maintained for a predetermined time or longer.

3. The automatic parking system of claim 1, wherein it is determined that there is the obstacle equal to or smaller than the threshold height when the additional primary engine driving torque exists and the vehicle is stopped for a predetermined time or longer.

4. The automatic parking system of claim 2, wherein the obstacle determiner re-identifies the presence of the obstacle by reducing and then increasing the additional primary engine driving torque according to a difference between the target speed and the the movement speed of the vehicle when it is determined that there is the obstacle equal to or smaller than the threshold height.

5. The automatic parking system of claim 1, wherein the obstacle determiner re-identifies the presence of the obstacle equal to or smaller than the threshold height by generating a secondary engine driving torque by applying a weighted value to the additional primary engine driving torque according to the difference between the target speed and the movement speed of the vehicle after reducing the engine driving torque.

6. The automatic parking system of claim 4, wherein the automatic parking controller controls the automatic parking of the vehicle toward a preset parking space when the obstacle determiner determines that the target speed and the movement speed of the vehicle are identical to each other after re-identifying the presence of the obstacle equal to or smaller than the threshold height.

7. The automatic parking system of claim 5, wherein the automatic parking controller controls the automatic parking of the vehicle toward a preset parking space when the obstacle determiner determines that the target speed and the movement speed of the vehicle become identical to each other after re-identifying the presence of the obstacle equal to or smaller than the threshold height.

8. The automatic parking system of claim 1, wherein the parking space adjustor adjusts the set parking space or changes an automatic parking termination condition according to a location of the obstacle equal to or smaller than the threshold height when it is determined that there is the obstacle equal to or smaller than the threshold height.

9. An automatic parking method comprising:
setting a parking space based on information acquired through a sensor of a vehicle;
controlling automatic parking of the vehicle toward the set parking space;
determining whether there is an obstacle having a height shorter than a threshold height detectable by the sensor of the vehicle as an obstacle based on one or more pieces of information on a target speed, a movement speed, and engine driving torque of the vehicle while the automatic parking of the vehicle is controlled; and
adjusting the set parking space when it is determined that there is the obstacle equal to or smaller than the threshold height,
wherein the determining of whether there is the obstacle equal to or smaller than the threshold height comprises re-identifying the presence of the obstacle by reducing and then increasing additional primary engine driving torque according to the difference between the target speed and the movement speed of the vehicle when it is determined that there is the obstacle equal to or smaller than the predetermined height.

10. The automatic parking method of claim 9, wherein the determining of whether there is the obstacle equal to or smaller than the threshold height comprises determining that there is the obstacle equal to or smaller than the predetermined height when a difference between the target speed and the movement speed of the vehicle exists and the difference is maintained for a predetermined time or longer.

11. The automatic parking method of claim 9, wherein the adjusting of the set parking space comprises adjusting the set parking space or changing an automatic parking termination condition when the difference between the target speed and the movement speed of the vehicle exists after re-identifying the presence of the obstacle equal to or smaller than the threshold height.

* * * * *